No. 767,759. Patented August 16, 1904.

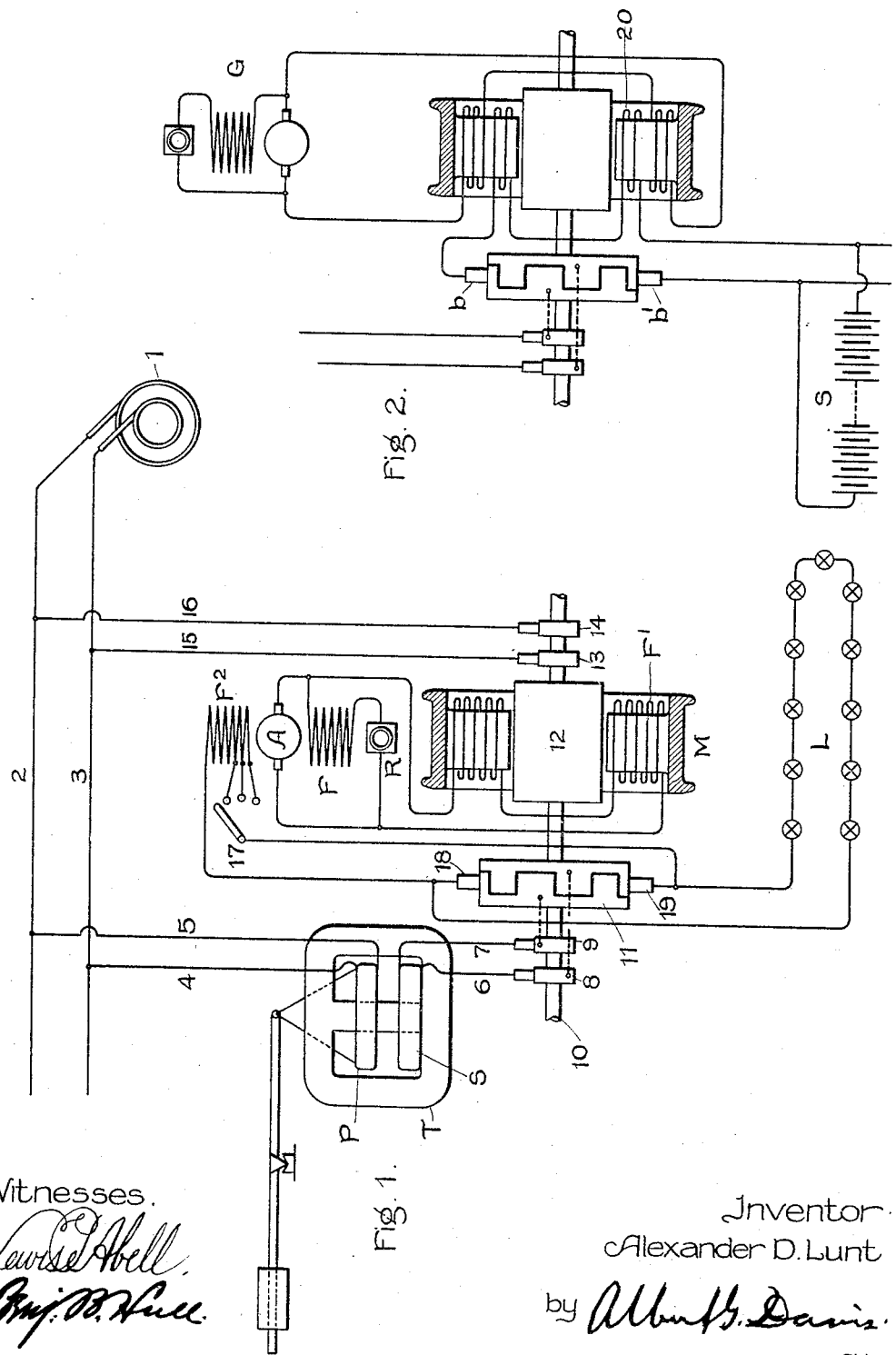

UNITED STATES PATENT OFFICE.

ALEXANDER D. LUNT, OF SCHENECTADY, NEW YORK, ASSIGNOR TO THE GENERAL ELECTRIC COMPANY, A CORPORATION OF NEW YORK.

RECTIFIER FOR PERIODIC CURRENTS.

SPECIFICATION forming part of Letters Patent No. 767,759, dated August 16, 1904.

Application filed January 6, 1900. Serial No. 539. (No model.)

*To all whom it may concern:*

Be it known that I, ALEXANDER D. LUNT, a citizen of the United States, residing at Schenectady, county of Schenectady, State of New York, have invented certain new and useful Improvements in Rectifiers for Periodic Currents, of which the following is a specification.

In rectifying alternating currents it is necessary that the commutation take place at a particular point in the alternating wave in order that there may be a minimum amount of sparking. To secure this result, it has heretofore been necessary to shift the rectifier-brushes backward or forward upon the commutator until a position is found at which there is the least sparking. This operation may be performed manually or automatically; but in either case the necessity for adjustment is a troublesome matter. Moreover, if the phase relation between the impressed electromotive force and the current to be rectified changes the rectification will take place at a different point in the alternating wave and generally at a point such as to cause increased sparking. It is therefore necessary to adjust the brushes of the rectifier with almost every change in value and shifting in phase of the alternating current.

My present invention aims to do away with the operation of moving parts in adjusting the commutation-point of an alternating-current rectifier and secures the same beneficial result without attendant mechanical difficulties by causing the rectifying-commutator to be shifted in position backward or forward instead of shifting the brushes, which instead of being moved, as heretofore, are maintained stationary. This result is obtained by varying the field strength of the synchronous motor driving the rectifier.

As is well known, the armature of a synchronous motor is shifted backward with respect to the alternating wave when the field strength of the motor is diminished and pushed forward when the field strength is increased, and it is this fact which I take advantage of in adjusting the commutation of a rectifying device driven by such a motor, the adjustment being secured by varying the field of the motor, at the same time maintaining the brushes fixed.

The field strength of the synchronous motor may be controlled in various ways; but as some of these methods are hereinafter described I do not definitely refer to them here more than to state that my invention is not limited to any particular method shown, but, on the contrary, is of much broader scope.

My invention possesses special advantages when used for rectifying current derived from a constant-current transformer. One objection which has been found to the use of such a transformer is that the power factor varies within wide limits between no load and full load, being high at full load and low at small loads. This causes considerable energy loss and trouble in voltage regulation by reason of the large amount of lagging current demanded at times from the supply-mains. By employing a rectifying apparatus of the type above briefly outlined I am enabled to largely overcome or entirely eliminate this objectionable feature of the operation of such transformers, and I accomplish this result by causing the field of the synchronous motor driving the rectifier to be in general overexcited and to increase or decrease in strength as the power factor of the constant-current transformer tends to decrease or increase, respectively. The leading component of current supplied to the mains by the synchronous motor thus counteracts the lagging component of the current due to the said transformer, and by properly proportioning the parts these opposing tendencies may be caused to balance more or less approximately, thus securing any desired power factor for the current supplied to the transformer and rectifier. As the field strength of the synchronous motor is varied with change of load, the point of commutation of the alternating current is also correspondingly varied, and this should be in such amount as to secure a minimum amount of sparking, this result being the one primarily to be secured, the compensation for drop in power factor of the constant-current transformer being secondary. By suitable relation of parts, however, the maximum benefit both as to commutation and power factor may be secured for the same field strength of the synchronous motor.

Although I have thus briefly pointed out the general nature of my invention, its scope is to be determined by reference to the claims appended hereto. As to its details and mode of application a fuller understanding of the same will be had upon an examination of the following description, taken in connection with the accompanying drawings, in which—

Figure 1 represents an apparatus for rectifying current delivered by a constant-current transformer, while Fig. 2 represents a modified form of rectifying apparatus.

In Fig. 1 a main source of alternating current is shown at 1, from which lead mains 2 3 for distributing or transmitting current generated thereby. A constant-current transformer T is shown with its primary P connected through leads 4 5 with the mains 2 3 and its secondary S by means of conductors 6 7 to a rectifying apparatus. The object of employing a rectifying apparatus in connection with a constant-current transformer is to render possible the use of alternating current for the purpose of supplying direct current of constant value to translating devices requiring the same. Although I have shown in the drawings a constant-current transformer of a well-known type, I do not consider my invention as limited to the employment of the same or of any other type of transformer, and for this reason I have deemed it unnecessary to illustrate the transformer more particularly or otherwise than diagrammatically. The conductors 6 7 from the secondary of the said transformer are connected to slip-rings 8 9 on the shaft 10 of the rectifier. The slip-rings are connected to segments of opposite polarity, respectively, of a rectifying-commutator of any ordinary form, as illustrated diagrammatically at 11. This commutator is shown as mounted upon the shaft of and driven by a synchronous motor M of suitable size and character. The armature is shown at 12, and its winding is connected through suitable collector or slip rings 13 14 with conductors 15 16, leading to the mains 2 3 of the main source of alternating-current supply. The direct-current field of the synchronous motor may be excited from any suitable source, and in the present instance I have shown a small direct-current generator employed for this purpose. This generator is of the ordinary shunt type, having an armature A and the usual shunt-field F, controlled by a rheostat R. The terminals of the motor are connected directly to the terminals of the field-winding F' of the synchronous motor, as will readily be understood. Automatic control of the field-magnet strength of the synchronous motor corresponding to variations of load on the constant-current transformer is secured by varying the field strength of the exciting-generator in accordance with variation of electromotive force across the circuit carrying the rectified current. The means for effecting this result consists of a winding $F^2$ on the field of the exciting-generator, which winding is supplied from a circuit connected across the brushes of the rectifying-commutator. The full difference of potential of the rectified circuit is thus impressed on the winding $F^2$, and for purposes of initial regulation this winding is subdivided, taps coming out from a number of points in the winding and terminating in suitable contacts, over which a switch-arm 17 may pass. The brushes 18 and 19, bearing on the rectifier-commutator, are thus connected one to one terminal of the winding $F^2$ and the other to such a point in the length of said winding as may be determined by the position of the switch-arm 17 upon its coöperating contacts. The brushes 18 and 19 are also connected to the work-circuit, formed in this instance by a comparatively large number of direct-current arc-lamps L in series. In describing the mode of operation of this apparatus let it be supposed that the constant-current transformer is feeding a given number of lamps and that the field strength of the synchronous motor has been adjusted so as to bring the motor-armature backward or forward to the point of minimum sparking for the commutator, it being assumed, of course, that the brushes on the commutator have been adjusted once for all in a neutral position, such that a movement of the motor-armature backward or forward may be able to accomplish the adjustment desired. If now the load is increased by including in the series circuit an additional number of lamps, the first result is to decrease the current-flow therein. The mutual repulsive force exerted between the coils of the transformer thus decreases accordingly and the coils move toward each other and into closer mutual inductive relation, thereby increasing the secondary electromotive force and bringing the current back to its normal value. By reason of the approach of the primary and secondary members of the said transformer there is less leakage flux, and consequently less self-induction, in the two coils. The lagging current drawn from the mains is thus decreased, and the secondary current in its turn is brought nearer into phase with its impressed electromotive force. If the rectifier-commutator with respect to its brushes were to bear a fixed relation to the phase of the impressed electromotive force as it rotates, this approach in phase of the secondary current to its impressed electromotive force, together with the phase shifting in the primary circuit, would cause the commutation to take place at a point in the alternating wave, at which an increase in sparking would occur. This effect is prevented, however, by shifting the commutator forward or backward, as may be required, the result being accomplished by reason of the change in electromotive force between the rectifier-brushes acting upon the winding F² of the exciting-generator. As the electromotive force on the rectifying-commutator is increased by the action of the transformer in the manner described, the current in the winding F² is increased, which in turn increases the electromotive force of the exciting-generator, and consequently increases or decreases the field strength of the generator, according to whether the winding F² is in conjunction or opposition. The resultant change in electromotive force of the exciting-generator acts to vary the field of the synchronous driving-motor, the armature of which is moved backward or forward with respect to the wave of alternating current to be rectified.

I have not definitely stated whether or not the field of the driving-motor should be increased or decreased, since this depends upon the manner in which the brushes are adjusted on the rectifying-commutator. Thus if the brushes are in position to rectify from the beginning of a given period then the strength of field of the motor must either increase or decrease, while if the brushes are adjusted to rectify from the end of a period then the variation of field of the motor must be made in the opposite direction. In any particular case experiment will quickly determine which direction of variation is required. To secure the best results from the rectifying apparatus shown, it is necessary that the field strength of the motor should be decreased as the load on the rectifier-circuit increases and increase as the said load decreases in order thereby to compensate for lagging current in the line. If, therefore, upon experiment it be found that an increase of load requires decrease in field strength of the motor to suitably adjust the point of communication, then connections are properly made to secure at the same time compensation of the lagging current due to the transformer by the leading current of the motor. If an opposite variation of strength of the motor-field is required to reduce the sparking, then the brushes on the rectifier-commutator must be moved backward or forward a small amount, so as to rectify from a reverse point in the alternating wave. The proper adjustment of the point of commutation may then be secured by increasing the field strength instead of decreasing it. Other adjustments and means of regulation will readily suggest themselves to those skilled in the art, so that further reference to the same is unnecessary.

Fig. 2 illustrates a somewhat different form of rectifying apparatus. In this case the rectifier is supposed to convert alternating current at constant potential supplied from some suitable source into direct current. The rectifying-commutator, collector-rings, and synchronous driving-motor are the same as shown in Fig. 1, except that the means for exciting the field of the motor is somewhat different. In this case the synchronous driving-motor is provided with two windings, one of which is excited from any suitable source of direct current—as, for example, from a small direct-current generator G—while through the other winding (shown at 20) is passed the whole or a suitable part of rectified current delivered from the brushes $b\ b'$ of the rectifier commutator. The current in the rectified circuit being in this instance at constant potential increases or decreases as the load varies. In order, therefore, to adjust the point of commutation of the rectifier with increase or decrease of load, it is necessary that the field strength of the synchronous driving-motor be varied in accordance with the variation of current in the rectified circuit. Therefore, in the present instance, as the current in the work-circuit increases or decreases the field strength of the motor is automatically increased or decreased to correspond, thus shifting the rectifier-commutator backward or forward with respect to the impressed alternating wave of electromotive force and, with suitable connections and adjustments, securing minimum sparking at the instants of commutation. As already explained, it is not strictly necessary that the field strength should be either increased or decreased in every case corresponding, respectively, to an increase or decrease of load; but, on the contrary, the field must be either increased or decreased corresponding to a particular adjustment of brushes on the commutator. Storage batteries S are shown as supplied from the rectifier in Fig. 2; but it will be evident that any other form of translating device may be employed, if desired.

What I claim as new, and desire to secure by Letters Patent of the United States, is—

1. The combination of alternating-current mains, a constant-current transformer fed therefrom and means for causing leading current to flow in the mains of a value varying inversely with variation of load on the transformer.

2. Alternating-current mains, a constant-current transformer supplied therefrom, means for rectifying current from said transformer and means controlled by rectified current for varying the power factor of current in said mains.

3. Alternating-current mains, a device of varying self-induction fed therefrom and means controlled by current in said device for taking a leading current from said mains.

4. The combination of alternating-current mains, a constant-current transformer connected thereto, and means for automatically causing a leading current to flow in the mains in response to variation of the lagging current taken by the transformer.

5. The combination of a synchronous motor, a rectifying-commutator driven thereby, means for supplying to said commutator alternating current other than that flowing to said motor, and means controlled by rectified current for varying the power factor of current supplied to said motor.

6. The combination of a synchronous motor, a rectifying device for alternating current other than that supplied to said motor, and means controlled by rectified current for varying the excitation of the motor.

7. The combination of a synchronous motor, a rectifying device separate from the motor but driven thereby, and means for automatically varying the field strength of the motor.

8. The combination of a synchronous motor, a rectifying device separate from the motor but driven thereby, and means for automatically varying the power factor of current supplied to the motor.

9. The combination of a synchronous motor fed with current from a given circuit, a rectifying device driven thereby and fed with current from another circuit, and means for automatically varying the field excitation of the motor.

10. The combination of a synchronous motor, a rectifying device driven thereby and receiving alternating current over leads distinct from the supply-leads for the motor, and means for automatically varying the excitation of the motor in response to variation of power of the rectified current.

11. The combination of a synchronous motor, a rectifying device distinct therefrom but driven thereby, and means for automatically varying the power factor of current supplied to the motor in response to variation of power of the rectified current.

In witness whereof I have hereunto set my hand this 2d day of January, 1900.

ALEXANDER D. LUNT.

Witnesses:
BENJAMIN B. HULL,
MABEL E. JACOBSON.